United States Patent Office 3,145,207
Patented Aug. 18, 1964

---

3,145,207
PROCESS FOR PREPARING EPOXY ALKYLOXY-METHYLAMINO-s-TRIAZINES
Henry P. Wohnsiedler, Noroton, Conn., assignor to American Cyanamid Company, New York, N.Y., a corporation of Maine
No Drawing. Filed Sept. 12, 1960, Ser. No. 55,192
5 Claims. (Cl. 260—249.6)

This invention relates to novel resinifiable compositions of matter, to resinous products prepared therefrom, and to methods of producing such compositions and products. This invention further relates to resinifiable compositions of matter essentially constituting epoxy alkyloxymethylamino-s-triazines and to the resinous products derived therefrom. More specificaly, and in narrower aspects, this invention relates to thermosetting, essentially monomeric, polymerizable compositions of matter and thermosetting monomeric compounds having particular utility in the protective coating field, and to the substantially insoluble and infusible products resulting from the curing of said compositions and compounds either by themselves or in the presence of other polyfunctional materials capable of reacting with an epoxy group.

This application is a continuation-in-part of my copending application Serial No. 836,949, filed August 31, 1959, now abandoned.

The aminotriazine structural configuration has been utilized successfully in preparing thermosetting resinous compositions of wide utility. Unquestionably the outstanding forte of the thermoset products derived from such compositons resides in their excellent decorative quality combined with their outstanding hardness, non-flammability and thermal stability. These resinous products also possess marked resistance to abrasion and to chemical and photochemical decomposition. The excellent thermal stability exhibited by the aminotriazine resins is deemed to be imparted by the symmetrical triazine ring structure.

Melamine resins, so called, represent the prototype of thermosetting resinous compositions derived from amino-triazines. These resins are extensively used in molding, laminating and protective coating applications and as such comprise potentially condensable reaction products of melamine with formaldehyde. The monomers used in the preparation of intermediate condensation products may be simply the methylolated derivatives of melamine, or a lower alkyl ether of a methylol melamine. The latter type product is often referred to as an alkylated methylol melamine, or as a melamine alcohol formal. The end use intended for the resin primarily determines whether the condensate is desirably of the alkylated or unalkylated type, i.e., the unalkylated type is ordinarily used in molding applications, while the alkylated type is used extensively for protective coating applications, e.g., in textile and paper finishes.

In either event, the monomers represented by the aforesaid derivatives of melamine are converted into resinous products through condensation-type reactions wherein volatile by-products are generated. In the case of the methylolated melamine derivatives, the by-product consists of water, while in the condensation of the alkylated derivatives, either inter se or in the presence of a hydroxyl-bearing material, an alcohol is given off corresponding to the alcohol employed as the alkylating agent. Notwithstanding the excellent properties associated with the thermosetting products derived from melamine resins, this feature of the cure reaction prevents realization of their very best properties. As mentioned, volatile products are formed during the curing of these resins, the curing mechanism being, as indicated, a furtherance of condensation between the respective monomers. Whether the melamine resin is employed in a molding composition or in a protective coating composition, the volatile products given off during the condensation or curing reaction itself do not give rise to any significant deleterious effect. However, after the condensates have been transformed into substantially insoluble and infusible products, a certain minor amount of progressive condensation continues to occur. The loss of volatile by-products in this progressive condensation reaction is known to detract from the melamine resin's dimensional stability. Dimensional instability manifests itself as crazing and cracking within the resinous product and more particularly on the surface thereof. It is further known that the occurrence of crazing and cracking accelerates the ultimate complete decomposition of the resinous product, particularly when the product is exteriorly exposed. On the other hand, where the product is not exposed exteriorly, the occurrence of crazing will adversely affect the appearance and the mechanical and physical properties of the product.

Various expedients have been employed to minimize the inherent dimensional instability associated with melamine resin products. For instance, it has been found that when a large quantity of inert material is combined with the thermoset melamine resin, such as in the preparation of molding compositions where a large quantity of filler is employed, the dimensional stability of the molded or thermoset product is markedly improved. When the melamine resin is employed in the preparation of protective coatings, a different approach is taken, such as combining the melamine resin with relatively large amounts of an alkyd resin. As mentioned, the deficiency in dimensional stability exhibited by condensates of methylolated aminotriazines is greatly minimized by these procedures. Nevertheless, the need for resinifiable materials based on triazine ring compounds whose curing mechanisms do not evolve any volatile component or for that matter depend exclusively on a volatile-producing reaction is obviously indicated.

There have been several attempts in the prior art to prepare thermosetting resinous compositions containing high proportions of triazine and yet wherein the polymerization or condensation reaction experienced in the curing thereof does not involve the generation of either water or alcohol.

One of the first attempts along these lines was to alkenylate a methylol derivative of an aminotriazine. Specifically, this attempt was principally confined to reacting an unsaturated alcohol such as allyl alcohol with any one of the methylolated melamines. However, it was found that even though as many as five or six unsaturated groups of this type may be attached to the melamine nucleus via the usual etherification procedure, the resultant products nevertheless polymerized very sluggishly. Accordingly, this method of producing thermosetting resinous compositions from a triazine compound left much to be desired.

Subsequent to the aforesaid atempt, the triazine compound cyanuric acid became commercially available. Polymerizable materials were prepared from cyanuric acid by reacting said acid or its equivalents, such as cyanuric chloride, with suitable reactants so as to result in unsaturated esters of the cyanuric acid, such as for example triallyl cyanurate. The principal disadvantage of such polymerizable derivatives resides in their relatively high cost of preparation. Furthermore, this type of monomeric material converts into a thermoset state by means of an addition-type polymerization reaction which gives hydrocarbon linkages. In the resin art, and particularly in the field of protective coatings, advantages have chiefly been associated with thermoset resinous products obtained by an addition mechanism wherein the bridging or repeated linking unit consists of an ether grouping.

Another prior art method of utilizing the triazine configuration in thermosetting compositions was to prepare epoxy esters of cyanuric acid. These materials can be prepared by reacting cyanuric chloride with a glycidol compound or alternatively by the reaction of cyanuric chloride with a mono halohydrin of a trihydric alcohol followed by dehydrohalogenation of the resulting ester. Obviously, materials of this type will convert to a thermoset state without the evolution of water or alcohol during the course of reactions with active hydrogen-bearing materials which lead to a polymerized state, and additionally, will result in ether-linked units. Thermoset products derived from these resinous materials possess marked thermal stability and in contrast to the conventional melamine resins they also exhibit vastly improved dimensional stability characteristics. However, the monomeric epoxy esters of cyanuric acid are costly to prepare at the present time.

I have now discovered novel resinifiable compositions of matter which, similar to the above-mentioned glycidyloxy triazines, undergo polymerization without the evolution of volatile by-products, but which, unlike the above-mentioned glycidyloxy triazines, may be readily prepared from commercially available and comparatively inexpensive aminotriazines, such as melamine.

Accordingly, it is an object of this invention to provide a readily available class of monomeric materials containing the s-triazine configuration which can be polymerized under suitable conditions without the evolution of any by-products.

It is a further object of this invention to provide methods for preparing epoxy-substituted methylolated aminos-triazines, i.e., epoxy alkyloxymethylamino-s-triazines.

These and other objects of my invention will be discussed more fully hereinbelow.

The novel resinifiable compositions of the present invention may be depicted by the following structural formula:

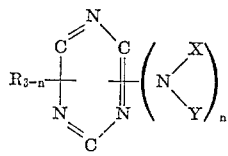

(A)

wherein the s-triazine ring substituents represented by R and

are directly attached to nuclear carbon atoms of the s-triazine ring, and wherein R may be hydrogen, alkyl, cycloalkyl, alkenyl, cycloalkenyl, aryl, aralkyl, alkaryl, or hydroxy, but with no more than one R being hydroxy, for reasons which will be more fully explained hereinbelow; $n$ is an integer of from 1 to 3; X and Y may be hydrogen, alkyl, cycloalkyl, alkenyl, cycloalkenyl, aryl, aralkyl, alkaryl, alkyloxymethyl, or an epoxy alkyloxymethyl group preferably one containing not more than eleven carbon atoms, represented by the structural formula:

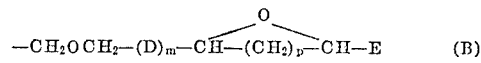

wherein D, if present, represents an alkylene radical, either straight or branched; E represents hydrogen, alkyl, or hydroxyalkyl; $m$ is an integer which is 0 of greater, and $p$ is an integer of from 0 to 2; with at least one of the total number of amino substituents represented by

in Formula A above containing at least one of said epoxy alkyloxymethyl groups represented by Formula B. From a consideration of the above formula, it will be noted that the total number of carbon atoms present in the radicals represented by D and E will preferably not exceed seven, and also that when $n$ is 3 there will be no radicals represented by R attached to the triazine nucleus in Formula A.

A preferred class of my novel resinifiable compositions represented by Formula A above comprises the triamino-s-triazine derivatives represented by the structural formula:

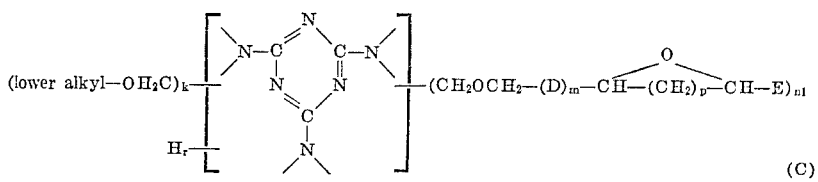

(C)

wherein D, E, $m$ and $p$ are as defined for Formula B above; $n_1$ is an integer of from 1 to 6, $k$ and $r$ are integers of from 0 to 5, and the sum of the integers $n_1$, $k$ and $r$ equals 6. Epoxy lower alklyoxymethyl groups such as glycidyloxymethyl, 2,3-epoxy butoxymethyl, and the like are especially suitable as substituents in these resinifiable compositions.

The foregoing monomeric resinifiable compositions of my invention are derived from aminotriazines represented by the structural formula:

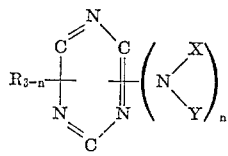

(D)

wherein the s-triazine ring substituents represented by R and

are directly attached to nuclear carbon atoms of the s-triazine ring, and wherein R has the same meaning as given for the R substituents in Formula A above, A and B may be hydrogen, alkyl, cycloalkyl, alkenyl, cycloalkenyl, aryl, aralkyl, or alkaryl, with at least one of the total number of amino substituents represented by

containing at least one aldehyde-reactive hydrogen atom, and $n''$ is an integer of from 1 to 3. An illustrative but by no means exhaustive enumeration of such amino-s-triazines includes the following: triamino-s-triazines such as melamine; 2-mono-substituted-amino-4,6-diamino-s-triazines such as the N-methyl, N-butyl, N-phenyl, N-tolyl, and N-cyclohexyl melamines; 2,4,6-tris (mono-substituted-amino)-s-triazines such as 2,4,6-tris(methylamino)-s-triazine; 2-di-substituted-amino-4,6-bis(mono-substituted-amino) - s - triazines such as 2-dimethyl-amino-4,6-bis (methylamino) - s-triazine; 2-di-substituetd-amino-4,6-di-amino-s-triazines such as 2-diphenylamino-4,6-diamino-s-triazine; pentamethyl melamine, and the like; diamino-s-triazines such as the guanamines, e.g., formoguanamine, acetoguanamine, adipoguanamine, sebacoguanamine, benzoguanamine, diphenyladipoguanamine, and the like; ammeline; monoamino-s-triazines such as formoguanide, benzoguanide, and the like.

The nature of the present invention can perhaps best be understood by reference to a detailed consideration of the applicable alternative processes that can be utilized in preparing my novel resinifiable compositions from the essential starting material, namely, an aminotriazine such as is represented by Formula D above. However, it is to be appreciated that this invention is not limited to the processes outlined hereinbelow but more broadly contemplates the resinifiable compositions, by whatever means prepared, and their uses in the preparation of thermoset products. With this in mind, the following schematic diagram will illustrate several, although not necessarily all, of the applicable alternative processes which may be employed in preparing my novel resinifiable compositions, using melamine as an illustration:

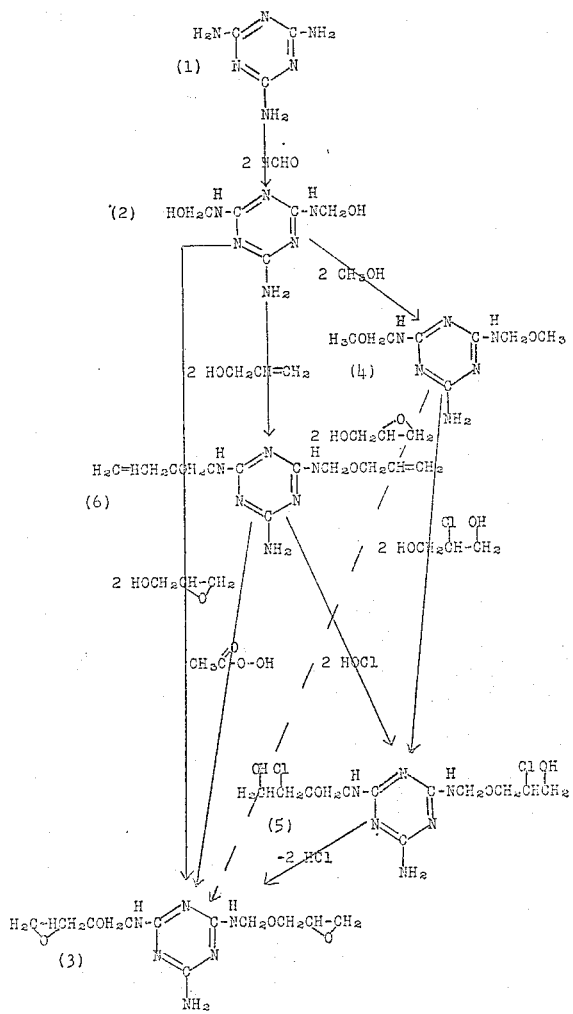

Each of the alternative processes for the preparation of my novel resinifiable compositions illustrated above involve the same first step, i.e., methylolation of an appropriate aminotriazine. This is a well known step in the resin art and further details regarding the methylolation mechanism and the conditions employed to produce methylolated products will not be pursued here. The extent of methylolation possible is of course dependent upon the number of active hydrogens existing in the specific aminotriazine compound employed in the methylolation step. Useful resinifiable compositions can be prepared in accordance with this invention from aminotriazines corresponding to the formula given above wherein only one active hydrogen is present. However, the ultimate resin products derived from such monomethylolated derivatives are limited to linear polymeric materials. When an aminotriazine having a plurality of active hydrogens is employed, such as for example melamine, it is possible to methylolate all of the active hydrogens existing in compounds of this type. However, where it is desirable to produce thermosetting compositions for protective coating applications, it will be generally desirable to employ methylolated triazine compounds where only two or at the most three of the active hydrogens have undergone reaction with formaldehyde. In general, hydroxyl substituents on the triazine ring may give rise to complications in the methylolation and subsequent alkylation procedures. Consequently, these triazines must be considered individually in light of this invention. For instance, it is known that a compound such as ammelide will methylolate but that its alkylation is brought about with difficulty. Accordingly, the use of this triazine is not particularly preferred in the practice of this invention. However, compounds containing only one hydroxy substituent, such as ammeline or the guanides, will combine with formaldehyde to yield suitable starting materials for the preparation of the resinifiable compositions contemplated herein.

Again with reference to the above flow sheet, the preferred process for preparing my novel resinifiable compositions comprises the transetherification of one of the aforementioned methylolated aminotriazines with an appropriate epoxy alkanol, as shown, for example, in reaction sequence $(1) \to (2) \to (3)$.

Epoxy alkanols suitable for this purpose will preferably contain not more than ten carbon atoms and include those represented by the structural formula:

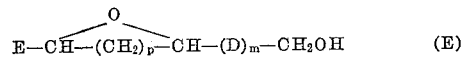

$$E-CH-(CH_2)_p-CH-(D)_m-CH_2OH \qquad (E)$$

wherein D, E, $m$ and $p$ are as defined for Formula B above. Examples of suitable epoxy alkanols include 2,3-epoxypropanol (glycidol), 2,3-epoxybutanol, 2,3-epoxy-2-methylpropanol, 3,4-epoxybutanol, 2,3-epoxypentanol, 5,6-epoxy-hexanol, 9,10-epoxyoctadecanol, 2,3-epoxybutanediol-1,4, and the like. The epoxy alkanols employed as reactants may be prepared by any suitable method, such as by dehydrohalogenation of a corresponding halohydroxy substituted alcohol, which in turn may be prepared from the corresponding olefinic alcohol by treatment with hypohalous acid. In addition, such olefinic alcohols may be converted to the corresponding epoxy alkanols by treatment with a per-acid.

The preferred form of the aminotriazine reactant to be reacted with the epoxy alkanol, as indicated in the above flow sheet, is the methylol derivative rather than the alkyloxymethyl derivative. The methylolated aminotriazines may generally be reacted with an epoxy alkanol at low temperatures, e.g., 15–50° C., and preferably 20–30° C. The advantage in this will be demonstrated in the working examples given hereinbelow.

Precautionary measures must be taken when an alkyloxymethyl derivative of the aminotriazine reactant is transetherified with an epoxy alkanol, since the epoxy alkanols in general are rather sensitive to the elevated temperatures that must be employed in the transetherification reaction. Depending on the particular epoxy alkanol, elevated temperatures may result in loss of the epoxy group by undesirable side reactions such as premature self-reaction of the epoxy alkanol, which reaction will be accelerated by the presence of conventional transetherification catalysts, if employed. However, transetherification of an alkyloxymethyl derivative of the aminotriazine reactant with an epoxy alkanol is feasible, and represents an additional method of preparing my novel resinifiable compositions, i.e., reaction scheme $$(1) \to (2) \to (4) \to (3)$$

Another alternative method involves the reaction scheme $(1) \to (2) \to (4) \to (5) \to (3)$ indicated in the above flow sheet. In this method, as well as where it is desired to react an alkyloxymethyl derivative of the aminotriazine reactant with an epoxy alkanol, the methylolated aminotriazine is alkylated with an alcohol. Suitable alcohols which may be used to prepare the alkyloxy derivatives of the methylolated aminotriazines include the various lower aliphatic monohydric alcohols such as methanol, ethanol, and propanol. Since the combined alcohol is lost in the subsequent transetherification reaction required to produce the ultimate products of this invention, it is preferred to use methanol, inasmuch as it represents the cheapest alkylating agent, and also since it is displaced with ease in the succeeding transetherification step. The alkylation reaction is carried out by merely dissolving the methylolated aminotriazine in an excess of the alkylating alcohol, applying moderate heating, if desired, and thereupon recovering the alkylated derivative. An acid catalyst is generally employed, and is neutralized after alkylation is complete.

It may be well to mention here that while the alkylated derivatives desired can be made as essentially pure compounds, it is possible that a certain amount of dimerization or trimerization may occur in the methylolation or alkylation step. Such mixtures are nevertheless useful, and indeed desirable, for the preparation of resinous coating compositions.

In the next step in this alternative method, the alkyloxymethyl aminotriazines are transetherified with a particular type of halogenated polyol. One suitable class of such polyol compounds consists of mono halohydrins, specifically the α- and β-mono halohydrins of saturated aliphatic trihydric alcohols, preferably those which contain not more than ten carbon atoms and which are represented by the structural formula:

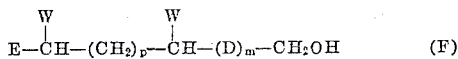

(F)

wherein one W is halogen, e.g., chlorine, bromine, or iodine, the other W is hydroxy, and D, E, $m$ and $p$ are as defined for Formula B above. This class of compounds includes glycerol-α-monochlorhydrin, glycerol-β-monochlorhydrin, 1-chloro-2,3-butanediol, 1-chloro-2,3-pentanediol, 2-chloro-1,3-pentanediol, 2-chloro-3,4-pentanediol, 1-chloro-2,3-hexanediol, 4-chloro-2,3-hexanediol, 1-chloro-2,3,4-butanetriol, and the like, as well as their homologs analogs, and suitable substitution products. The preferred member of this class is the α-monochlorhydrin of glycerol.

The transetherification reaction between the halohydrin and the triazine derivative is generally promoted by an acid catalyst. During this reaction the alcohol corresponding to the alkyloxy group of the triazine intermediate splits out. It has been found that the exchange reaction, when employing the halogenated alcohols as described hereinabove, is autocatalytic, due to the effect of the acidic halogen substituent. In reacting the mono halohydrin as described above with the alkyloxymethyl aminotriazine, it has been found that while such compounds contain both a primary and a secondary hydroxyl group, the latter group will nevertheless transetherify as well as the primary group. This is so because the halogen substituent on the carbon atom vicinal to the carbon atom containing the secondary hydroxyl group apparently activates this secondary hydroxyl group. Accordingly, when employing a polyol of this type, it is desirable to conclude the reaction once it is indicated that, on an average, one hydroxyl group per molecule of said polyol has reacted, as shown by the amount of by-product alcohol given off. Rapidly cooling the reaction mixture will accomplish this. I have found that when the halohydrins are reacted in this fashion a considerable proportion of the hydroxyl reacted will be secondary hydroxyl. The proportion reacting at this stage cannot be stated. However, the proportion reaction in this and the subsequent stages will generally not exceed about 50% of the primary and secondary hydroxyl reacted. Nevertheless, such transetherification products are useful in accordance with this invention as will be seen hereinbelow.

Employing the precaution as described, one may then suitably employ the β-monochlorhydrin of glycerol or its analogs such as represented by Formula F given above.

The transetherification reaction is carried out at a temperature of from about 60° C. to 150° C. but preferably below about 130° C. As mentioned, transetherification is continued until at least but not in excess of one of the hydroxyl groups of the polyhydric halohydrin has reacted. Also, all or only a portion of the alkyloxy groups contained by the aminotriazine may be transetherified, provided that on the average at least one halohydrin moiety is introduced, which substituent is capable of being dehydrohalogenated to form an epoxy grouping. The next and concluding step in the instantly described process for the preparation of the resinifiable compositions of this invention consists of dehydrohalogenating the transetherified product in order to introduce an epoxy group into said product. This is accomplished by first dissolving the transetherification product in a suitable solvent. Examples of suitable solvents include dioxane, xylene, toluene and the like. Also, solutions of water and such solvents as dioxane or a two-phase system such as xylene-water may be employed. Dehydrohalogenation is then effected by introducing into the solution a suitable basic metal compound such as a metal oxide, hydroxide, carbonate, or borate, and the like. The preferred basic metal compounds for effecting dehydrohalogenation constitute the alkali metal hydroxides and more specifically sodium hydroxide. The amount of basic metal compound to be employed can be conveniently based on the amount of halogen substituent contained by the transetherification product and on this basis may range from about 1.0 to 1.1 mols of sodium hydroxide per halogen equivalent or a larger proportion in the case of the less active basic metal compounds.

The dehydrohalogenation reaction is initiated on contact of the basic compound with the aforedescribed solutions at temperatures ranging from about room temperature to 50° C. The reaction is exothermic and sufficient heat is usually liberated to permit one to conduct the reaction at the desired temperature without resorting to external heating means, but external heating or cooling means may be utilized when necessary or desirable. The end point of the dehydrohalogenation process is noted when the reaction has run its course as evidenced by the cessation of exothermic heat of reaction. Generally, moderate periods of heating beyond this point are observed. The halide salt formed may be removed by filtration and the epoxidized triazine derivative then recovered by conventional drying procedures.

Another suitable method of preparing my epoxy alkyloxymethylamino-s-triazines involves the methylolation of a suitable amino-s-triazine followed by reaction of the methylolated derivative with an alkenyl alcohol to form the corresponding alkenyloxymethyl derivative. The preparation of such derivatives has previously been described by Widmer in Schweizer Archiv. für angewandte Wissenschaft und Technik, vol. II, pp. 1–19 (1954).

Alkenyl alcohols suitable for this purpose will preferably contain not more than ten carbon atoms and include those represented by the structural formula:

$$E-CH=CH-(D)_m-CH_2OH \qquad (G)$$

wherein D, E and $m$ are as defined for Formula B above. This class of compounds includes allyl alcohol, methallyl alcohol, crotyl alcohol, 1-hydoxy-3-hexene, 1,4-dihydroxybutene-2, and the like.

Depending on the number of active hydrogens in the amino-s-triazine starting material an equal number of methylol groups and, in turn, alkenyloxymethyl groups may be introduced. For example, in the case of melamine, hexallyloxymethyl melamine has been prepared.

The further treatment of the alkenyloxymethylamino-s-triazine may follow either of two courses:

(1) Direct epoxidation, e.g., with peracetic acid, perbenzoic acid, hydrogen peroxide, and the like, as indicated by reaction scheme (1)→(2)→(6)→(3), or (2) Treatment with hypohalous acid, e.g., hypochlorous or hypobromous acid, followed by dehydrohalogenation, e.g., with a base such as alkali metal hydroxide e.g., sodium hydroxide and the like, as indicated by reaction scheme (1)→(2)→(6)→(5)→(3).

The novel compositions of this invention are especially useful for the production of solid resinified products or polymers, particularly those having utility in protective coating applications. Additionally, the resinifiable compositions of this invention may be used as molding compounds in molding compositions and also as the infused resinous component of laminates. These resinifiable compositions of matter may be self-condensed or they may be reacted with suitable cross-linking or hardening agents. Whether a material serves as a catalyst or hardening agent is primarily determined by the amount used. For instance, a material such as phthalic anhydride can function as a catalyst or as a cross-linking agent. On the other hand, a material such as stannic chloride serves primarily as a catalytic agent. The hardening agent can be either of acidic or basic character, e.g., such substances as ethylene diamine, phosphoric acid, the various dibasic carboxylic acids such as phthalic acid, maleic acid, adipic acid or the anhydrides thereof, polymeric acids such as polyacrylic, vinyl copolymers containing carboxyl groups, and the like. The amount of polymerizing agent employed, whether serving in a catalytic nature or as a cross-linking agent, will preferably range from about 2% to 35% by weight, based on the resinifiable compositions of matter. The compositions of this invention are preferably cured by the application of heat. A suitable elevated temperature curing range is from about 125 to 200° C.

The compositions of this invention are characterized chiefly by the epoxy alkyloxymethyl groups in their molecular structure. The epoxy group has known reactivity towards acids, bases, alcohols, mercapto and amide groups, the reaction with these materials being one of addition. It is not essential, however, that all of the groups be exclusively of the epoxy type. In fact, one of the advantages of the invention is that the functional or reactive groups characteristic of known aminotriazine monomers and polymers may be further diversified. Thus, in addition to the reactive groups

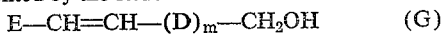

$-NH_2; -NH, -CH_2OH$ and $CH_2OR''$ where R″ represents alkyl, it is now possible to diversify R″ to include the group

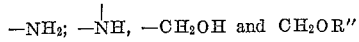

by choosing suitable starting materials. In addition to the group

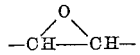

the configuration

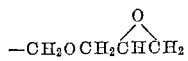

can be introduced by reaction of a methylol melamine with glycidol under hydrolytic conditions or otherwise. Thus, the composition of aminotriazine polymers and resins can be broadened for diversification of their uses with other monomeric or polymeric materials such as polyvinyl alcohol-acetate, polyamides, epoxy resins derived from diphenylol propane, polyesters, polyhydroxy esters, cellulose, the naturally occurring fibrous proteins, polyacrylamide, polyacrylonitrile, or polystyrene, where the aminotriazine resin serves as a cross-linking agent, hardening agent, thermosetting agent, protective or finishing agent (as in textile treatment), or to increase the thermal stability of such polymeric materials.

In order that those skilled in the art may more fully understand the inventive concept presented herein, the following illustrative examples are set forth. These examples are given by way of illustration and should not be considered as expressing limitations unless so set forth in the appended claims. All parts and percentages are by weight, unless otherwise stated.

*Example I*

195 parts by weight of hexamethoxymethyl melamine and 221 parts of glycerol α-monochlorhydrin were charged into a suitable reaction vessel equipped with a stirrer, thermometer, and means for collecting volatile distillate. The molar ratio of melamine to glycerol derivative represented by this charge was 0.5:2.0, respectively.

The two reactants were heated with stirring to a temperature of 126° C. in about 1.5 hours. The distillate collected amounted to 81 parts by volume, which represents the etherification of approximately one equivalent of hydroxyl per mol of glycerol α-monochlorhydrin charged. At this point, the reaction mixture was rapidly cooled to room temperature employing external cooling means.

To the transetherification product described directly hereinabove was added 500 parts of dioxane. A homogeneous solution of the transetherification product with the added solvent was accomplished by stirring. The temperature of the solution was then raised to 40° C. 80 parts of powdered sodium hydroxide in 20-part portions were added at regular intervals over a period of 15 minutes. The temperature during this addition rose exothermically to 52° C. The temperature was increased to 55° C. after all of the sodium hydroxide had been added and this temperature maintained for 37 minutes. Thereupon, the mixture was filtered to remove the precipitated salt. Analytical testing indicated that 95% of the sodium hyroxide had reacted.

The resultant solution was assayed for nonvolatile content by drying at a temperature of 105° C. The dried product was a soft, balsamic resin. This assay indicated that 94% of the weight of the expected product was recovered. Estimation of the epoxide content of the resinous product by the pyridine hydrochloride method revealed 16.8% of epoxide oxygen or 55% of the expected theoretical value.

*Example II*

130 parts by weight of hexamethoxymethyl melamine and 74 parts glycerol α-monochlorhydrin (proportion of 1 to 2 mols) were reacted in a manner similar to that described in Example I. The temperature was taken to 100° C. when 15 parts by weight of distillate had been collected equal to 70% of the expected methanol for the reaction of two equivalents of chlorhydrin hydroxyl per mol of the triazine. For the second stage, 55 parts of the product were dissolved in 100 parts dioxane and 20 parts water and 16 parts of 50% aqueous sodium hydroxide added. The temperature was maintained at 40–50° C. for about 5 hours and the base was added at a fairly constant rate throughout this period. After separating the precipitated salt, water was removed from the system by concentrating under reduced pressure. Assay for epoxide revealed that 54% of the expected conversion had taken place.

*Example III*

To the product of Example II, sebacic acid was added at two concentration levels, 4 and 10% based on the resin content. These solutions were cast as films on tinned sheet panels and after air drying, they were baked at 160° C. Both films attained a hard, scratch-resistant state, while at the same time their flexibility was good, panels withstanding bending around a 1/8 inch curvature. They moreover retained excellent color and withstood immersion in 80° C. water for 1 hour without adverse effect. Whereas 15 hours baking time was needed to reach this condition with 4% sebacic acid, only 1½ hours were required at the higher level of acid.

*Example IV*

$N^2,N^4,N^6$-tetramethyl melamine was converted to the dimethoxymethyl derivative by usual procedures and purified by distillation. Its boiling point was 171° C. at 2.5 mm. Hg. To 13.5 parts of this compound, 7.4 parts of glycidol were added and heating carried out under distillation conditions. Without any significant distillate appearing at 117° C., .02 part p-toluene sulfonic acid was added, the system placed under reduced pressure and heating continued. After 10 minutes, the reaction product was exceedingly viscous. Fifty percent of the expected methanol had been collected. Dissolved in toluene at this stage, it was determined that the epoxide content was only minor in amount but that films deposited from this solution could be hardened to a solvent-resistant stage within 15 minutes at 150° C.

*Example V*

In place of the triazine reactant used in Example IV, dimethylol-$N^2,N^4,N^6$-tetramethyl melamine was reacted with glycidol. 61 and 74 parts, respectively, together with 1.2 parts concentrated hydrochloric acid were stirred together at 25° C. Additional acid was added in course of the reaction for a total of 7 parts. After 1 hour, the reaction had advanced from a slurry to a clear liquid stage. Sodium hydroxide, 12 parts 50% aqueous, was added. Water-soluble components were removed from the reaction product by extraction and it was then dissolved in ethylether. In its solvent-free form, the product was a colorless balsamic resin for which solubility in toluene, chloroform and ethylene glycol mono acetate was noted. Ninety-five percent of the expected product weight was recovered and epoxide found was equivalent to 58% diglycidyloxymethyltetramethyl melamine.

*Example VI*

Among a number of acid and basic hardening catalysts tested with the product of Example V, dimethylaminopropyl amine was one of the more effective. With 5% of added catalyst, hard solvent-resistant films were obtained after baking 1½ hours at 150° C. In the absence of catalyst, thermosetting took place within ½ hour at 200° C.

The product of Example V was reacted with an equimolar amount of sebacic acid, i.e., in the proportion of 1.8 to 1 part. The product remained fluid up to 200° C. where it converted to the hardened form.

It is obvious from the foregoing that one of the primary objectives of this invention pertains to providing a novel class of resinifiable aminotriazine derivatives which possess the manifold advantages associated with the triazine structure but which do not present the disadvantages inherent in the process of curing known aminotriazine resin precursors. However, I have found that other materials containing aldehyde-reactable groups such as the amido group may be employed to prepare suitable epoxy derivatives corresponding to the aminotriazine derivatives discussed hereinabove. For the most part these epoxy derivatives of compounds other than those containing the triazine ring do not permit the preparation of resinous products exhibiting the marked excellent properties associated with the instant aminotriazine derivatives. However, for some purposes, particularly where economic factors are a prime consideration, epoxidized derivatives of a large variety of amido compounds prepared according to the practices disclosed herein may be desirable, and indeed preferred for certain specific applications.

The various materials that may be associated with an epoxy radical in the manner described for the epoxy alkyloxymethylamino-s-triazines includes such materials as ureas, dicarboxamides, and the like. In preparing such epoxy derivatives, difficulties are involved which may not be experienced in the preparation of the corresponding triazine derivatives. This is so because materials such as the alkyloxymethyl ureas and similar derivatives of the polyamides are prone to develop undesirable side reactions, that is, the amido derivative which is employed in the epoxidation reaction has a tendency to react with itself, thereby hindering the desired epoxidation reaction. Additionally I have observed that these reactants show decidedly less reactivity with typical epoxidizing reagents, e.g., the epoxy alkanols, than do the corresponding aminotriazine derivatives. Nevertheless, depending upon the nature of the alkyloxymethylamido derivative, one may employ one or several of the methods described in connection with the preparation of the aminotriazine derivatives to effect the preparation of suitable end products. Thus, in some instances, alkyloxymethylamido derivatives may be transetherified with epoxy alkanols, or allyloxymethylamido derivatives may be converted directly to epoxy derivatives by treatment with per-acids. Additionally, under certain circumstances the alkyloxymethylamido derivatives may be transetherified with a mono halohydrin and then dehydrohalogenated to yield the desired epoxy derivatives. Similarly, in some instances it may be possible to directly react an epoxy alkanol with methylolated derivatives of the amido compounds. This procedure may be used where the required presence of an acid alkylation catalyst will not adversely affect the desired reaction mechanism. Considering the plurality of amido compounds that may be employed in accordance with my teaching, and in view of the fact that the specific nature of the amido compound involved perhaps dictates the use of a particular reaction mechanism, a generalized statement as to applicable procedures for producing the epoxy derivatives cannot be made. Nevertheless, one skilled in the art may readily ascertain an applicable procedure in any given situation.

A suitable material for conversion to an epoxy derivative in the manner contemplated is the uron compound dimethoxymethyl uron, which may be prepared in accordance with the procedure set forth by H. Kadowaki in Bull. Chem. Soc. Japan, vol. 11, pages 248–61 (1936). This method consists generally of reacting approximately 1 mol of urea with 4 mols of formaldehyde in the presence of barium hydroxide with heating, followed by concentration of the formed tetramethylol urea by evaporation. The resinous concentrate is then dissolved in methyl alcohol and the syrup is acidified with concentrated hydrochloric acid and stirred at room temperature for 15 minutes. After neutralizing with barium hydroxide and filtering, the solution is concentrated to remove free methanol and the concentrate extracted with chloroform to separate inorganic salt. Thereafter the recovered product is treated with ether to remove minor amounts of by-product that may be contained in the reaction mixture. Substantially pure N,N'-dimethoxymethyl uron corresponding to the following formula:

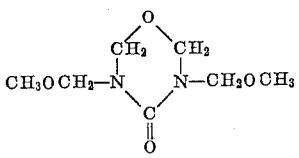

may be obtained by conventional fractionation of the ether extracted residue. The dimethoxymethyl uron may be then transetherified with an epoxy alkanol such as for example glycidol or, alternatively, N,N'-diallyloxymethyl uron may be prepared by the above procedure and this converted to an epoxy derivative by reaction with peracetic or perbenzoic acids or hydrogen peroxide.

In addition to N,N'-dimethoxymethyl uron, other urea-type compounds may be employed, such as, for example, the alkyloxymethyl derivatives of urea itself, biuret, biguanide, dicyandiamide, thiourea, and the like. One or all of the reactive hydrogens associated with the aforementioned urea type compounds may be methylolated and then alkylated, however, preferably at least two of said active hydrogens are methylolated and then subsequently alkylated. Allyloxymethyl derivatives of these urea compounds may also be employed in the preparation of the epoxy alkyloxymethyl ureas in the same manner as the allyl derivatives of the aminotriazines described hereinabove.

In addition to the urea-type compounds, a variety of polymethylene saturated aliphatic dicarboxamides may be employed to prepare the alkyloxymethyl derivaties thereof and then subsequently epoxidized. Examples of such polyamides include succinamide, gluteramide, adipamide, sebacamide, etc. In addition to these polymethylene types, polyamides such as malonamide and oxamide may be advantageously employed. Of the unsaturated type polyamides the compounds fumaramide and maleamide are particularly exemplary of polycarboxamides which may be methylolated and then alkylated with an epoxy alkanol or alternatively, methylolated, alkylated and then converted to the epoxy derivative by the various means described hereinbefore. Additionally, the aromatic carboxamides, such as, for example, the various diamides of phthalic acid and the diamides of a 4,4'-alkylidene dibenzoic acid may be used. Illustrative of the latter amides include the amides of 4,4'-,2,2-butylidene)dibenzoic acid; 4,4'-(1,1,2,2-tetramethylethylene)dibenzoic acid; 3,3'-isopropylidene dibenzoic acid; 3,3'-(2,2-butylidene)dibenzoic acid; 4,4'-(2,2-pentylidene)dibenzoic acid; 4,4'-(3,3-heptylidene)dibenzoic acid; 3,3'-(4,4-octylidene)dibenzoic acid; 3,3'-(5,5-nonylidene)dibenzoic acid, and the like.

It will be obvious that other changes and variations may be made in carrying out the present invention without departing from the spirit and scope thereof as defined in the appended claims.

I claim:

1. A process for the preparation of an epoxy alkyloxymethylamino-s-triazine which comprises reacting:
   (A) a methylolated amino-s-triazine of the general formula:

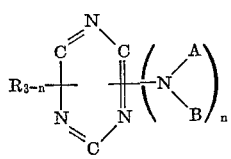

wherein R is a member selected from the group consisting of hydrogen, alkyl, cycloalkyl, alkenyl, cycloalkenyl, aryl, aralkyl, arkaryl and hydroxy, no more than one R being hydroxy, n is an integer of from 1-3, and A and B are members selected from the group consisting of hydrogen, alkyl, cycloalkyl, alkenyl, cycloalkenyl, aryl, alkaryl, aralkyl and —CH$_2$OH groups, at least one of the total number of amino substituents represented by A and B containing at least one of said —CH$_2$OH groups, with
   (B) an epoxy alkanol containing not more than ten carbon atoms represented by the structural formula:

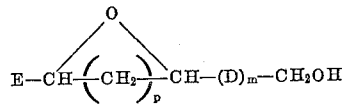

wherein D is an alkylene radical, E is a member selected from the group consisting of hydrogen, alkyl and hydroxyalkyl, m is an integer of from 0-7, and p is an integer of from 0-2
at a temperature of from about 0° C. to about 60° C. in the presence of an acid catalyst and recovering the epoxy alkyloxymethylamino-s-triazine produced.

2. A process for the preparation of a glycidyloxymethylamino-s-triazine which comprises reacting:
   (A) a methylolated amino-s-triazine of the general formula:

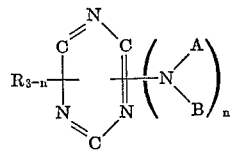

wherein R is a member selected from the group consisting of hydrogen, alkyl, cycloalkyl, alkenyl, cycloalkenyl, aryl, aralkyl, alkaryl and hydroxy, no more than one R being hydroxy, n is an integer of from 1-3, and A and B are members selected from the group consisting of hydrogen, alkyl, cycloalkyl, alkenyl, cycloalkenyl, aryl, alkaryl, aralkyl and —CH$_2$OH groups, at least one of the total number of amino substituents represented by A and B containing at least one of said —CH$_2$OH groups, with
   (B) glycidol
at a temperature of from about 0° C. to about 60° C. in the presence of an acid catalyst and recovering the glycidyloxymethylamino-s-triazine produced.

3. A process for the preparation of a glycidyloxymethyl melamine which comprises reacting:
   (A) a hydroxymethyl melamine with
   (B) glycidol
at a temperature of from about 0° C. to about 60° C. in the presence of an acid catalyst and recovering the glycidyloxymethyl melamine produced.

4. A process for the preparation of a glycidyloxymethyl melamine which comprises reacting:
   (A) trimethyl-N$^2$, N$^4$,N$^6$-trimethyl melamine with
   (B) glycidol
at a temperature of from about 0° C. to about 60° C. in the presence of an acid catalyst and recovering the glycidyloxymethyl melamine produced.

5. A process for the preparation of a glycidyloxymethyl melamine which comprises reacting:
   (A) trimethylol-N$^2$,N$^4$,N$^6$-trimethyl melamine with
   (B) glycidol
at a temperature of from about 0° C. to about 60° C. in the presence of an acid catalyst and recovering the glycidyloxymethyl melamine produced.

References Cited in the file of this patent

UNITED STATES PATENTS

| | | |
|---|---|---|
| 2,197,357 | Widmer et al. | Apr. 16, 1940 |
| 2,414,289 | Ericks | Jan. 14, 1947 |
| 2,528,359 | Greenlee | Oct. 31, 1950 |
| 2,594,452 | Kosmin | Apr. 29, 1952 |
| 2,892,810 | Albrecht | Jan. 30, 1959 |
| 2,980,676 | Zuppinger et al. | Apr. 18, 1961 |

UNITED STATES PATENT OFFICE
CERTIFICATE OF CORRECTION

Patent No. 3,145,207

August 18, 1964

Henry P. Wohnsiedler

It is hereby certified that error appears in the above numbered patent requiring correction and that the said Letters Patent should read as corrected below.

Column 2, line 57, for "atempt" read -- attempt --; column 4, line 7, for "of" read -- or --; column 5, line 10, for "substituetd" read -- substituted --; column 11, line 17, for "avderse" read -- adverse --; column 13, line 73, for "arkaryl" read -- alkaryl --; column 14, line 54, for "trimethyl-" read -- trimethylol- --; line 61, for "trimethylol-$N^2,N^4,N^6$-trimethyl" read -- dimethylol-$N^2,N^4,N^6$-tetramethyl --.

Signed and sealed this 15th day of December 1964.

(SEAL)
Attest:

ERNEST W. SWIDER
Attesting Officer

EDWARD J. BRENNER
Commissioner of Patents